United States Patent
Kaku (10) Patent No.: US 9,832,049 B2
(45) Date of Patent: Nov. 28, 2017

(54) RELAYING APPARATUS

(71) Applicant: DENSO CORPORATION, Kariya, Aichi-pref. (JP)

(72) Inventor: Yoshifumi Kaku, Kariya (JP)

(73) Assignee: DENSO CORPORATION, Kariya (JP)

(*) Notice: Subject to any disclaimer, the term of this patent is extended or adjusted under 35 U.S.C. 154(b) by 73 days.

(21) Appl. No.: 15/138,254

(22) Filed: Apr. 26, 2016

(65) Prior Publication Data

US 2016/0380790 A1   Dec. 29, 2016

(30) Foreign Application Priority Data

Jun. 24, 2015  (JP) ................................ 2015-126637

(51) Int. Cl.
*H04L 25/20* (2006.01)
*H04L 12/707* (2013.01)

(52) U.S. Cl.
CPC ............. *H04L 25/20* (2013.01); *H04L 45/22* (2013.01)

(58) Field of Classification Search
None
See application file for complete search history.

(56) References Cited

U.S. PATENT DOCUMENTS

| 7,209,435 | B1* | 4/2007 | Kuo ...................... H04L 45/00 370/219 |
| 8,718,797 | B1* | 5/2014 | Addepalli ............. H04W 4/046 700/17 |
| 2008/0107027 | A1 | 5/2008 | Allan et al. |

* cited by examiner

*Primary Examiner* — Christine Duong
(74) *Attorney, Agent, or Firm* — Posz Law Group, PLC (57) ABSTRACT

A communication network includes relaying apparatuses, each including redundant-route ports providing communication routes between the relaying apparatuses. The relaying apparatus determines whether a first frame received via a usual port is highly important. The first frame being highly important is transmitted via the respective redundant-route ports; the first frame being not highly important is transmitted via one redundant-route port. The relaying apparatus receives a second frame being highly important via the respective redundant-route ports; the second frame has a transmission destination corresponding to an apparatus connected with the relaying apparatus via the usual port. The relaying apparatus makes determination whether or not all the second frames received via the respective redundant-route ports accord with each other. With affirmative determination, one of the second frames is transferred to the transmission destination. With negative determination, all the second frames are cancelled.

8 Claims, 6 Drawing Sheets

RELAYING APPARATUS

CROSS REFERENCE TO RELATED APPLICATION

The present application is based on Japanese Patent Application No. 2015-126637 filed on Jun. 24, 2015, the disclosure of which is incorporated herein by reference.

TECHNICAL FIELD

The present disclosure relates to a relaying apparatus included in a communication network.

BACKGROUND ART

Patent Literature 1: JP 2010-509825 A (US 2008/0107027 A1)

There is formed a ring topology of a network of Ethernet (registered trademark) by connecting a plurality of Ethernet switches (hereinafter, referred to as a switch) as relaying apparatuses.

Such ring topology includes two communication routes between the respective switches. For instance, each switch has (i) two ring ports used for the ring connection and (ii) non-ring ports via which an apparatus is connected with the switch. Suppose that a subject switch transmits, via each of two ring ports, a frame whose transmission destination is an apparatus with which a different switch is connected via a non-ring port of the different switch. Then, the transmitted frame is inputted into the different switch via each of the ring ports of the different switch. This signifies that two communication routes are provided between (i) an apparatus with which a subject switch is connected via a non-ring port of the subject switch and (ii) an apparatus with which a different switch is connected via a non-ring port of the different switch.

Another technology disclosed in Patent literature 1 is to perform a frame transmission between nodes using a predetermined shortest route.

SUMMARY

Applying such technology in Patent Literature 1 to a communication network having a plurality of communication routes between the relaying apparatuses may provide the effect of reduction in traffic (i.e., data volume to be transmitted), but not provide the improvement of reliability in communication.

It is an object of the present disclosure to provide a relaying apparatus that provides a communication network with appropriate balance between the reliability of the communication and the reduction of traffic.

To achieve the above object, according to an aspect of the present disclosure, a relaying apparatus in a communication network is provided as follows. The communication network includes a plurality of relaying apparatuses that are defined to include the relaying apparatus and a plurality of different relaying apparatuses. Each of the plurality of relaying apparatuses includes at least two redundant-route ports providing a plurality of communication routes between the plurality of relaying apparatuses. A first one of the plurality of relaying apparatuses transmits a frame via each of the redundant-route ports of the first one. The frame has a transmission destination that is a connected apparatus connected with a second one of the plurality of relaying apparatuses via a usual port of the second one. The usual port is different from the redundant-route ports. The frame transmitted from the first one enters the plurality of relaying apparatuses other than the first one via the redundant-route ports of the plurality of relaying apparatuses other than the first one.

The relaying apparatus includes (i) a first importance determination section; (ii) a number-of-ports switchover section; (iii) a second importance determination section; (iv) a first transfer section; (v) an accordance determination section; and (vi) a second transfer section. The first importance determination section determines whether a first frame has a high importance based on a first rule, the first frame being received via the usual port of the relaying apparatus, the first frame having a transmission destination corresponding to a connected apparatus with which one of the plurality of different relaying apparatuses is connected via the usual port of the one of the plurality of different relaying apparatuses. The number-of-ports switchover section transmits the first frame via each of the redundant-route ports of the relaying apparatus when the first importance determination section determines that the first frame has the high importance, and transmits the first frame via one of the redundant-route ports of the relaying apparatus when the first importance determination section does not determine that the first frame has the high importance. The second importance determination section determines whether a second frame has a high importance based on a second rule identical to the first route of the first importance determination section, the second frame being received via one of the redundant-route ports of the relaying apparatus, the second frame having a transmission destination corresponding to a connected apparatus with which the relaying apparatus is connected via the usual port of the relaying apparatus. The first transfer section transfers the second frame when the second importance determination section does not determine that the second frame has the high importance, the second frame being transferred using the usual port via which the relaying apparatus is connected with the connected apparatus corresponding to the transmission destination of the second frame. The accordance determination section determines whether all frames received via the redundant-route ports of the relaying apparatus accord with each other when the second importance determination section determines that the second frame has the high importance, all the frames including the second frame received via the one of the redundant-route ports. The second transfer section transfers one of all the frames received via the redundant-route ports when the accordance determination section determines that all of the frames accord with each other, the one of all the frames being transferred using the usual port via which the relaying apparatus is connected with the connected apparatus corresponding to the transmission destination of the second frame; the second transfer section cancels all the frames received via the redundant-route ports when the accordance determination section does not determine that all the frames accord with each other.

The above configuration will be explained with an example where a frame is transmitted from an apparatus A to an apparatus B. The apparatus A is connected with a first relaying apparatus via a first usual port of the first relaying apparatus; the apparatus B is connected with a second relaying apparatus via a second usual port of the second relaying apparatus. It is noted that each of the first relaying apparatus and the second relaying apparatus is according to the relaying apparatus of the aspect of the present disclosure.

Now, the apparatus A transmits a frame fA-B whose transmission destination is the apparatus B. The first relaying apparatus receives the frame fA-B from the apparatus A via the first usual port of the first relaying apparatus.

Then, in the first relaying apparatus, the first importance determination section determines whether the received frame fA-B has a high importance based on a first rule. The case when it is determined that the frame fA-B has a high importance is referred to as a first case. In the first case, the number-of-ports switchover section transmits the received frame fA-B via each of first redundant-route ports of the first relaying apparatus; then, the frame fA-B is inputted into each of second redundant-route ports of the second relaying apparatus. The second relaying apparatus thereby receives the frame fA-B via each of the second redundant-route ports.

In the first relaying apparatus, the case when it is not determined that the frame fA-B has a high importance is referred to as a second case. In the second case, the number-of-ports switchover section transmits the received frame fA-B via one of the first redundant-route ports of the first relaying apparatus; then, the frame fA-B is inputted into one of the second redundant-route ports of the second relaying apparatus. The second relaying apparatus thereby receives the frame fA-B via one of the second redundant-route ports.

Note that in each of the first case and the second case, the second relaying apparatus inevitably receives the frame fA-B via at least one of the second redundant-route ports, the frame fA-B whose transmission destination is the apparatus B connected with the second relaying apparatus via the second usual port of the second relaying apparatus.

Then, in the second relaying apparatus, the second importance determination section determines whether the received frame fA-B has a high importance based on a second rule identical to the first rule in the first importance determination section. Then, in the second case, the second importance determination section of the second relaying apparatus inevitably determines that the received frame fA-B has not a high importance. Then the first transfer section of the second relaying apparatus transfers the frame fA-B, which is received via one of the second redundant-route ports, using the second usual port via which the second relaying apparatus is connected with the apparatus B that is the transmission destination of the received frame fA-B.

In contrast, in the first case, the second importance determination section of the second relaying apparatus inevitably determines that the received frame fA-B has a high importance. In this case, the accordance determination section determines whether or not all of received frames fA-B via the respective second redundant-route ports accord with each other. Then, when the accordance determination section makes an affirmative determination (i.e., when all of the received frames fA-B are determined to accord with each other to be an identical frame), the second transfer section of the second relaying apparatus transfers the frame fA-B, which is received via any one of the second redundant-route ports, using the second usual port via which the second relaying apparatus is connected with the apparatus B that is the transmission destination of the received frame fA-B. In contrast, when the accordance determination section makes a negative determination (i.e., when all of the received frames fA-B are determined not to accord with each other), the second transfer section of the second relaying apparatus cancels the frames fA-B received via the second redundant-route ports. That is, when the negative determination is made by the accordance determination section, the frame fA-B is not transmitted to the apparatus B as the transmission destination.

According to the relaying apparatus of the aspect of the present disclosure, a frame having a high importance is enabled to be transmitted and received via a plurality of redundant-route ports, allowing the transmission using a plurality of communication routes. Further, when all of the received frames accord with each other to be an identical frame, such frame is transmitted to the apparatus as the transmission destination. This configuration thereby enhances the reliability of the communication. In the above example, the reliability of the communication from the apparatus A to the apparatus B can be improved.

In contrast, a frame not having a high importance is transmitted and received via a single redundant-route port, allowing the transmission using a single communication route. This can reduce traffic as compared with the configuration using a plurality of communication routes for transmission of all the frames.

The relaying apparatus of the aspect of the present disclosure can provide the communication network with balance between the reliability of the communication and the reduction of the traffic.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

The following explains a communication network according to an embodiment of the present disclosure.

First Embodiment (Configuration)

Figure 1:
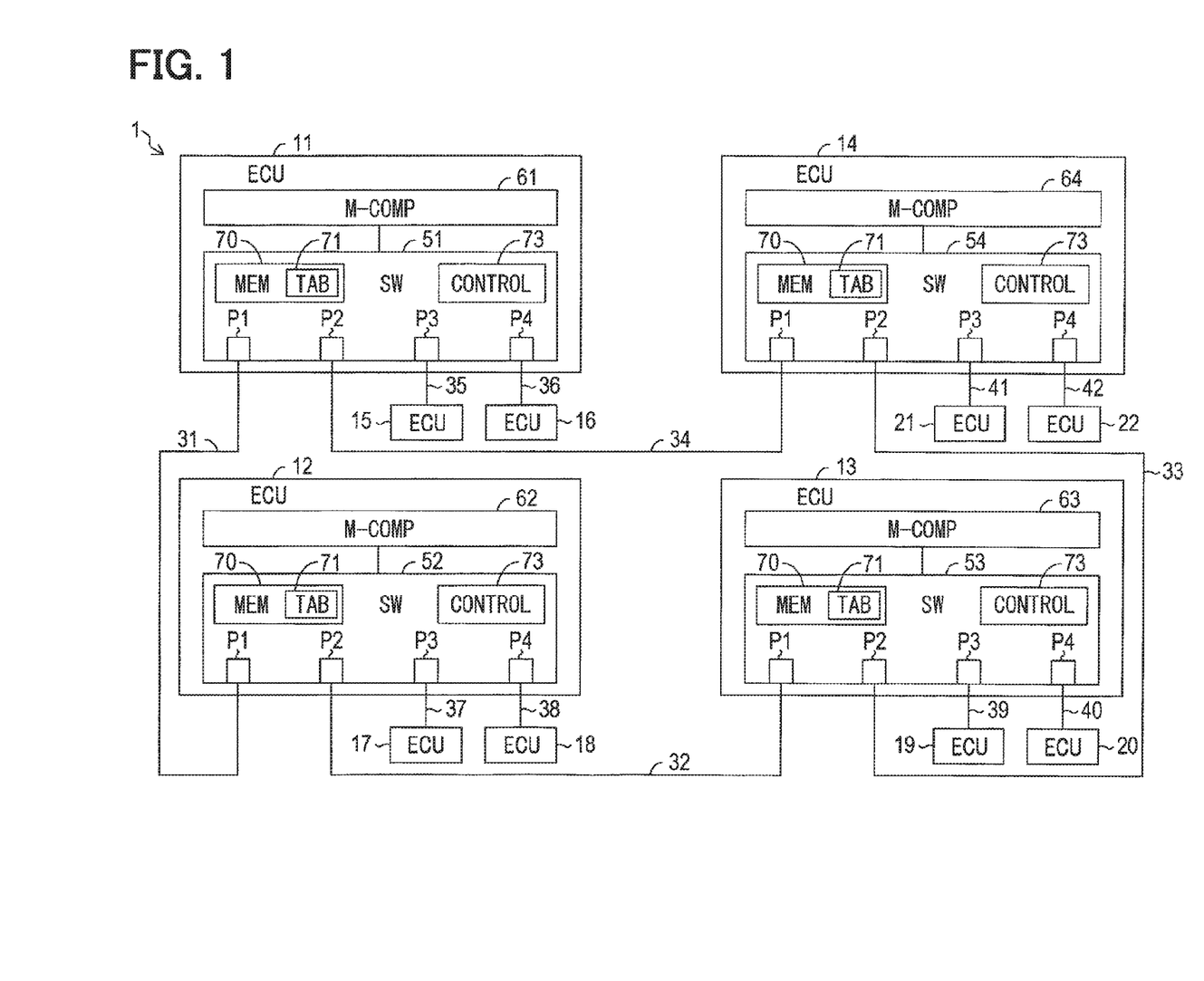
FIG. 1 is a diagram illustrating a configuration of a communication network according to a first embodiment of the present disclosure.

FIG. 1 illustrates a communication network 1 according to the first embodiment. For instance, the communication network 1 is an Ethernet network in an in-vehicle communication system mounted in a vehicle such as a passenger vehicle.

As in FIG. 1, the communication network 1 includes electronic control units (ECUs) 11-22 and communication lines 31-42. The ECUs 11-14, which serve as relaying apparatuses, relay the communication between other ECUs 15-22; the ECUs 11-14 include respective Ethernet switches 51-54 (hereinafter referred to as switches) that are network switches in Ethernet. The ECUs 11-14 further include, as arithmetic units, respective microcomputers 61-64 each containing CPU, ROM, and RAM (none shown).

The switches 51-54, which are, e.g., layer 2 switches (L2 switches), perform the communication for relay compliant with an Ethernet standard. Each switch 51-54 includes (i) a plurality of ports P1-P4, e.g., four ports P1-P4 in the present embodiment, (ii) a MAC address table 71, and (iii) a communication controller 73 performing the communication processing for relay in compliance with the Ethernet standard. The MAC address table 71 is stored in a memory 70 serving as a storage unit. The communication controller 73 includes, e.g., an integrated circuit or a microcomputer. As an example, the following operations by each switch 51-54 are executed by the communication controller 73.

In the communication network 1, a port P1 of the switch 51 of the ECU 11 is connected with a port P1 of the switch 52 of the ECU 12 using the communication line 31; a port P2 of the switch 52 of the ECU 12 is connected with a port P1 of the switch 53 of the ECU 13 using the communication line 32. Further, a port P2 of the switch 53 of the ECU 13 is connected with a port P2 of the switch 54 of the ECU 14 using the communication line 33; a port P1 of the switch 54 of the ECU 14 is connected with a port P2 of the switch 51 of the ECU 11 using the communication line 34.

In addition, a port 3 and a port 4 of the switch 51 of the ECU 11 are connected with ECUs 15 and 16 using the communication lines 35 and 36, respectively. A port 3 and a port 4 of the switch 52 of the ECU 12 are connected with ECUs 17 and 18 using the communication lines 37 and 38, respectively. A port 3 and a port 4 of the switch 53 of the ECU 13 are connected with ECUs 19 and 20 using the communication lines 39 and 40, respectively. A port 3 and a port 4 of the switch 54 of the ECU 14 are connected with ECUs 21 and 22 using the communication lines 41 and 42, respectively.

That is, the switches 51-54 are connected to form a ring circuit (i.e., ring connection or ring topology) by connecting the ports P1 and P2 of one of the switches 51-54 to the ports P1 and P2 of another one of the switches 51-54. This ring circuit may be also referred to as a loop circuit (i.e., connection or topology). Further, among the ports P1-P4 of the switches 51-54, the other ports P3 and P4 unused for the ring connection are connected with the ECUs 15-22.

This configuration permits the communication path between the switches 51-54 to have two routes starting from an origin, e.g., from the switch 51. The first route is a left-handed or counterclockwise cycling route from the switch 51 to the switch 52; the second route is a right-handed or clockwise cycling route from the switch 51 to the switch 54. Such communication path having two routes provides a dual backup redundancy on the communication between any two ECUs 15-22 that are connected to mutually different ECUs 11-14 (i.e., mutually different switches 51-54).

In the following, the ports P1 and P2 used for the ring connection of the switches 51-54 are referred to as ring ports or redundant-route ports; the ports P3 and P4 not used for the ring connection are referred to as usual ports or non-ring ports.

The MAC address table 71 in each switch 51-54 indicates an association between each port and a registered MAC address of at least one apparatus connected to each port; i.e., in the MAC address table 71, MAC addresses of apparatuses connected to the respective ports are registered with respect to the respective ports.

The MAC address table 71 is prepared by each switch 51-54 using a known MAC address learning function. That is, the switches 51-54 each receive a frame via a subject port that is any one of the ports P1-P4, and registers in the MAC address table (i) a port number of the subject port receiving the frame and (ii) the MAC address of the transmission source included in the frame, to be associated with each other. In other words, the MAC address of the transmission source is registered to the subject port having received the frame.

Figure 2:
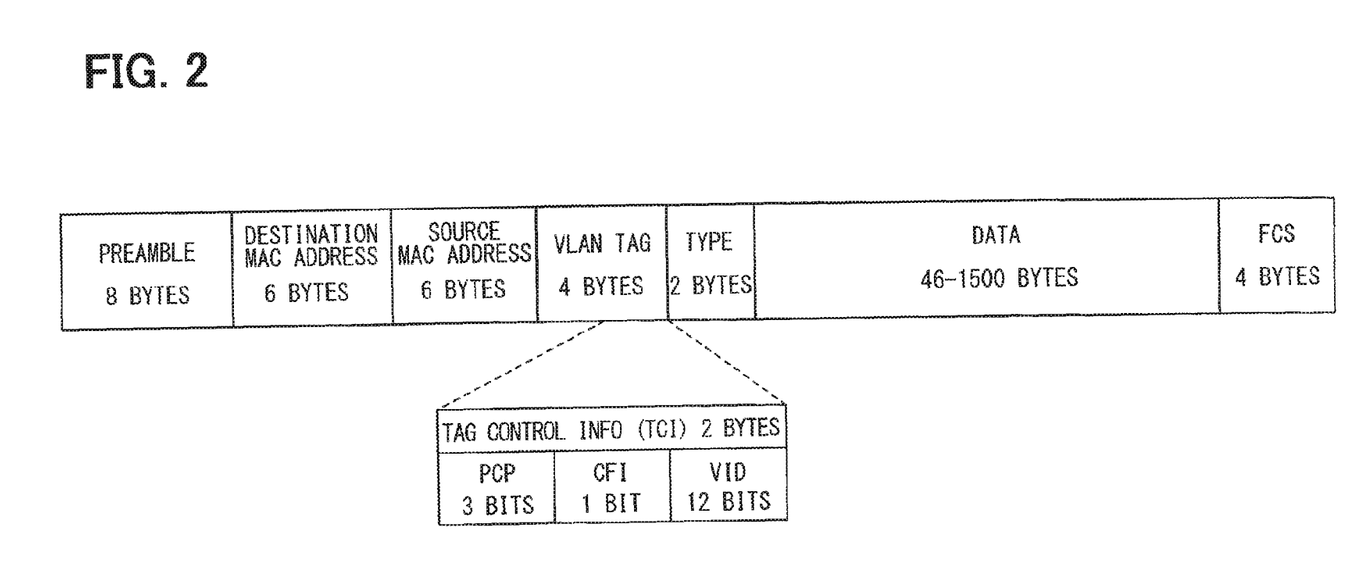
FIG. 2 is a diagram for explaining a configuration of Ethernet frame.

The communication network 1 uses, e.g., an Ethernet frame with a VLAN (Virtual Local Area Network) tag, as in FIG. 2. The Ethernet frame includes divisional areas such as a preamble, a transmission-destination MAC address, a transmission-source MAC address, a VLAN tag, a type, a data item, and an FCS (Frame Check Sequence). The transmission-destination MAC address is a MAC address of a transmission-destination apparatus, which is an apparatus corresponding to the transmission-destination of the frame; the transmission-source MAC address is an MAC address of a transmission-source apparatus, which is an apparatus corresponding to the transmission-source of the frame.

In addition, the VLAN tag area in the Ethernet frame contains four bytes of former two bytes and latter two bytes; the area of the latter two bytes stores tag control information (TCI). The tag control information contains PCP (Priority Code Point) having three bits, CFI (Canonical Format Indicator) having one bit, and a VID (VLAN Identifier) having twelve bits. The PCP is 3-bit information defined in the standard of "IEEE802.1p" for designating a priority of the frame, and assigned with any value of 0-7. The present embodiment uses the PCP as importance information which indicates the importance of the frame.

Each switch 51-54 has the following frame transfer function. That is, each switch 51-54 receives a frame via a subject port that is one of the ports P1-P4, and then determines a port serving as a transfer-destination port of the received frame among the ports P1-P4 other than the subject port based on (i) the MAC address table 71 and (ii) a transmission-destination MAC address included in the received frame. In particular, each switch 51-54 searches the MAC address table 71 for the registered MAC address that is identical to or corresponding to the transmission-destination MAC address. When the corresponding MAC address is found out as being registered, a transfer-destination port is determined as a determined port to which the MAC address searched for is registered in the MAC address table 71. In contrast, when the corresponding MAC address is not registered in the MAC address table 71, all the ports other than the subject port via which the frame is received are determined as transfer-destination ports also serving as determined ports. Each switch 51-54 then transmits the received frame via the port determined as the transfer-destination port. The frame transfer operation when the corresponding MAC address is registered in the MAC address table 71 is called filtering; the frame transfer operation when the corresponding MAC address is not registered is called flooding. In addition, the frame includes a broadcast frame for broadcasting; when receiving the broadcast frame, each switch 51-54 transfers the received broadcast frame in flooding.

Thus, the MAC address learning function and the frame transfer function of each of the switches 51-54 achieve the registration to the MAC address table 71 of MAC addresses of apparatuses connected with the respective ports P1-P4.

For instance, the MAC address table 71 of the switch 51, where the MAC address of the ECU 15 is registered to the usual port P3 and the MAC address of the ECU 16 is registered to the usual port P4. In addition, the MAC addresses of the ECUs 17-22 connected to the usual ports P3 and P4 of other switches 52-54 other than the switch 51 are registered to each of the ring port P1 and the ring port P2. This is because the ECUs 17-22 are connected with the ring ports P1 and P2 of the switch 51 via the other switches 52-54.

Similarly, e.g., the MAC address table 71 of the switch 52, where the MAC address of the ECU 17 is registered to the usual port P3 and the MAC address of the ECU 18 is registered to the usual port P4. In addition, the MAC addresses of the ECUs 15, 16, 19-22 connected to the usual ports P3 and P4 of other switches 51, 53, 54 other than the switch 52 are registered to each of the ring port P1 and the ring port P2.

Suppose, in the communication network 1, that a subject switch that is any one among the switches 51-54 transmits a frame via each of ring ports P1 and P2 of the subject switch; the frame has a transmission destination that is an ECU connected to one (a different switch) of different switches other than the subject switch via a usual port P3, P4 of the different switch. Such frame is inputted into each of the ring port P1, P2 of the different switch.

Further, suppose that the ECU 15, which is connected to the switch 51 via the usual port P3 of the switch 51, transmits a frame whose transmission destination is the ECU 19 connected to the switch 53 via the usual port P3 of the switch 53. In the present embodiment, the frame whose transmission destination is the ECU 19 is defined as a frame having, as a transmission-destination MAC address, the MAC address of the ECU 19. In contrast, the frame transmitted from the ECU 15 contains, as a transmission-source MAC address, the MAC address of the ECU 15. In the following, the frame transmitted from the ECU 15 of the transmission source to the ECU 19 of the transmission destination is indicated as frame f15-19.

In the above case, the switch 51 operates as follows. The switch 51 receives the frame f15-19 via the usual port P3 of the switch 51. The switch 51 transmits the received frame f15-19 via the ring port P1 of the switch 51. The frame f15-19 is inputted into the ring port P1 of the switch 53 after being passed through the switch 52. The switch 52, which receives the frame f15-19 from the switch 51 via the ring port P1 of the switch 52 itself, transmits the received frame f15-19 via the ring port P2 of the switch 52 itself with filtering.

In contrast, the switch 51 transmits the received frame f15-19 via the ring port P2 of the switch 51. The frame f15-19 is inputted into the ring port P2 of the switch 53 after being passed through the switch 54. The switch 54, which receives the frame f15-19 from the switch 51 via the ring port P1 of the switch 54 itself, transmits the received frame f15-19 via the ring port P2 of the switch 54 itself with filtering.

(Operations or Processes)

Each of the switches 51-54 (i.e., communication controllers 73) performs a first transfer control process, which is explained with reference to a flowchart in FIG. 3, and a second transfer control process, which is explained with reference to a flowchart in FIG. 4.

The following explanation defines (i) a subject switch as any one of the switches 51-54, (ii) a different switch as any one of the switches 51-54 other than the subject switch, (iii) a subject-switch connected ECU as an ECU connected with the subject switch via the usual port P3, P4 of the subject switch, and (iv) a different-switch connected ECU as an ECU connected with the different switch via the usual port P3, P4 of the different switch. For example, the switch 51 serving as the subject switch recognizes a different-switch connected ECU as any one of the ECUs 17-22; the switch 53 serving as the subject switch recognizes a different-switch connected ECU as any one of the ECUs 15-18, 21-22. For example, the switch 51 serving as the subject switch recognizes a subject-switch connected ECU as either the ECU 15 or the ECU 16; the switch 53 serving as the subject switch recognizes a subject-switch connected ECU as either the ECU 19 or the ECU 20.

It is further noted that a flowchart or processing of the process in the present embodiment includes sections (also referred to as steps), which are represented, for instance, as S110. Further, each section can be divided into several sections while several sections can be combined into a single section. Furthermore, each section can be referred to as a module, device, or a specific name, such as a determination module, a determination device, or a determiner, and achieved not only (i) as a software section in combination with a hardware unit (e.g., computer), but also (ii) as a hardware section (e.g., integrated circuit, hard-wired logic circuit), including or not including a function of a related apparatus. Further, the hardware section may be inside of a microcomputer.

Figure 3:
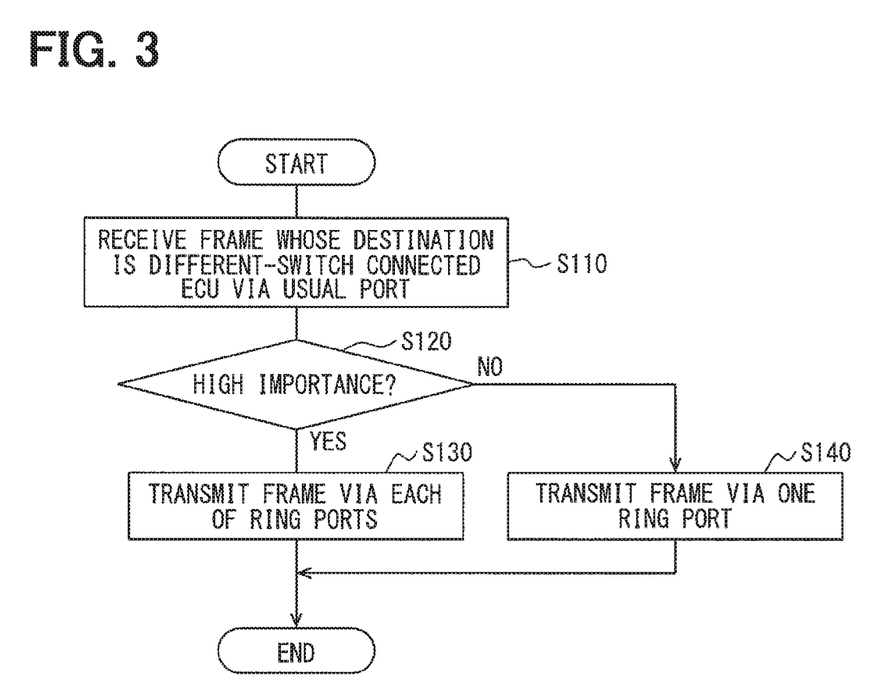
FIG. 3 is a flowchart illustrating a first transfer control process executed by a switch.

Refer to FIG. 3. A subject switch that is any one of the switches 51-54 receives a frame whose transmission destination is a different-switch connected ECU, via one of the usual ports P3, P4 of the subject switch (S110). The subject switch determines whether the received frame has a high importance based on a first rule (S120).

Here, the MAC address table 71 of the subject switch is referred to; when the transmission-destination MAC address of the received frame is registered to the ring ports P1, P2 in the table 71, the determination at S120 takes place.

In detail, at S120, it is determined whether the value of the PCP in the received frame corresponds to a predetermined importance indicated value; when the value of the PCP corresponds to the importance indicated value, it is determined that the received frame has a high importance. The importance indicated value may be single (i.e., one) or may be plural (i.e., more than one). In addition, for example, when the value of the PCP is either (i) equal to or greater than a predetermined threshold value or (ii) less than a predetermined threshold value, it may be determined that the received frame has a high importance. In addition, the value of the PCP is designated in the ECU serving as the transmission source of the frame. The frame having a high importance may be defined as a frame containing a high important data item in the data area. Thus the determination at S120 may determine whether the data item contained in the received frame has a high importance.

When it is determined that the received frame has a high importance at S120, the processing advances to S130, where the received frame is transmitted via each of the ring ports P1 and P2 of the subject switch.

In contrast, when it is not determined that the received frame has a high importance at S120, the processing advances to S140, where the received frame is transmitted via only one port of the ring ports P1 and P2 of the subject switch. Such only one port of the ring ports P1 and P2 may be predetermined; alternatively, only one port may be a port permitting the frame to be transmitted to take a shortest route.

Figure 4:
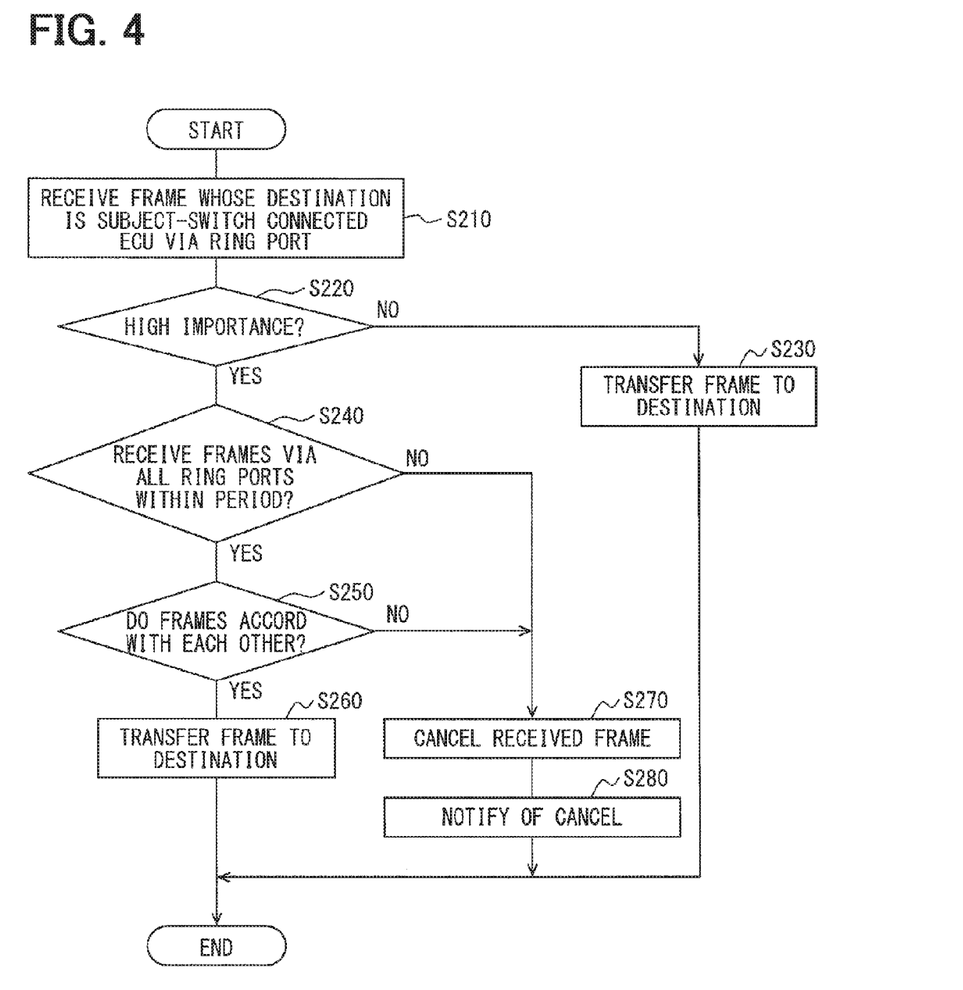
FIG. 4 is a flowchart illustrating a second transfer control process executed by a switch.

Refer to FIG. 4. In contrast, the subject switch receives a frame whose transmission destination is a subject-switch connected ECU, via one of the ring ports P1 and P2 of the subject switch (S214 It is then determined whether the received frame has a high importance (S220).

Here, similarly, the MAC address table 71 of the subject switch is referred to; when the transmission-destination MAC address of the received frame is registered to the usual port P3, P4 in the table 71, the determination at S220 takes place. The determination at S220 as to whether the received frame has a high importance is made based on a second rule identical to the first rule in the determination as S120 in FIG. 3.

When it is not determined that the received frame has a high importance at S220, the processing advances to S230, where the received frame is transferred to the transmission destination. That is, at S230, the subject switch transmits the received frame via one port of the ports P1-P4, the one port via which the subject switch is connected with the ECU corresponding to the transmission destination of the frame.

In contrast, when it is determined that the received frame has a high importance at S220, the processing advances to S240. At S240, the subject switch determines whether a different frame is received via any one of different ring ports of the subject switch within a predetermined time period starting from the time of having received the frame determined to have a high importance at S220. Here, the different ring ports are defined as the ring ports other than the ring port via which the frame determined to have a high importance is received. The present embodiment provides two ring ports P1 and P2, for instance; thus, the different ring port is, among two ring ports P1 and P2, the ring port other than the ring port via which the frame determined to have a high importance is received. In addition, the frame whose reception within the predetermined time period is determined at S240 is a frame whose transmission destination is identical to that of a determination target frame that is the frame determined to have a high importance at S220.

When the subject switch makes an affirmative determination of "YES" at S240, the processing advances to S250. At S250, it is determined whether all the frames received via the respective ring ports P1 and P2 accord with each other to be an identical frame. In the present embodiment, it is determined whether the frame received via the ring port P1 accords with the frame received via the ring port P2.

When the subject switch makes an affirmative determination of "YES" at S250, the processing advances to S260. At S260, the received frame is transferred to the transmission destination, similar to S230. The frame transferred at S260, as a transfer target frame, may be either the frame received via the ring port P1 or the frame received via the ring port P2. This is because two frames are determined to accord with each other or be an identical frame at the determination at S250.

In contrast, when the subject switch makes a negative determination of "NO" at S250, the processing advances to S270. At S270, the frames received via the respective ring ports P1 and P2 are canceled. That is, the frames received via the respective ring ports P1 and P2 are not transferred to the transmission destination. At S280, the subject switch notifies a communication partner such as a microcomputer of an ECU containing the subject switch of a message indicating that frames are canceled (S280). Here, the communication partner may be a microcomputer of an ECU, in the communication network 1, different from the ECU containing the subject switch.

In contrast, when the subject switch makes a negative determination of NO at S240, the processing advances to S270. The subject switch cancels a determination target frame which is the frame previously received via one of the ring ports P1 and P2. It is because (i) the frames have not been received via both the ring ports P1 and P2 even though the predetermined time period elapses, and, thereby (ii) the subsequent determination at S250 cannot be executed. Here, similarly, the subject switch performs a notification process at S280, to notify a communication partner of a message indicating the received frame is cancelled.

(Operation Example)

Suppose, in the communication network 1, that the ECU 15 transmits a frame f15-19 whose transmission destination is an ECU 19, similar to the above.

Here, the frame f15-19 is supposed to be a highly important frame that has a high importance; the highly important frame is a frame that is to be determined to have a high importance at S120 in FIG. 3 and at S220 in FIG. 4.

In the above case, the following takes place. The switch 51 receives the frame f15-19 from the ECU 15 via the usual port P3 of the switch 51. The switch 51 determines that the received frame f15-19 has a high importance as in FIG. 3 (S120: YES). The frame f15-19 is transmitted via each of the ring port P1 and P2 of the switch 51 (S130).

The frame f15-19 transmitted via the ring port P1 of the switch 51 passes through a communication route including the communication line 31, the switch 52, and the communication line 32, and then enters the switch 53 via the ring port P1 of the switch 53. In contrast, the frame f15-19 transmitted via the ring port P2 of the switch 51 passes through a communication route including the communication line 34, the switch 54, and the communication line 33, and then enters the switch 53 via the ring port P2 of the switch 53.

The switch 53 receives the frame f15-19 via either the ring port P1 or the ring port P2 of the switch 53, thereby determining, as in FIG. 4, that the received frame f15-19 has a high importance (S220: YES).

The switch 53 waits until frames are received via both the ring ports P1 and P2, then completing the reception (S240: YES). The switch 53 determines whether both the frames received via the respective ring ports P1 and P2 accord with each other to be an identical frame (S250). When determining such accordance in between both the received frames (S250: YES), the switch 53 transmits the received frame f15-19 to the ECU 19 of the transmission destination via the usual port P3 of the switch 53 (S260).

In contrast, when not determining the above accordance in between both the received frames via the respective ring ports P1 and P2 (S250: NO), the switch 53 determines that the reliability of the received frames f15-19 is low, thereby cancelling both the received frames 115-19 (S270).

In addition, suppose that, even after a predetermined time period starting from the time of receiving, as a determination target frame, the frame f15-19 via one of the ring ports P1 and P2, the switch 53 fails to receive another frame f15-19 via the other one of the ring ports P1 and P2 (S240: NO). Also in such a case, the switch 53 cancels the frame f15-19 received previously (S270).

The switch 53 then notifies either (i) the microcomputer 63 of the ECU 13 containing the switch 53 or (ii) a microcomputer of any other ECU, of a message indicating the received frame is cancelled (S280).

In contrast, the following explains the case that the frame f15-19 is not a highly important frame. The switch 51 does not determine that the received frame f15-19 has a high importance as in FIG. 3 (S120: NO). The frame f15-19 is transmitted via only one port of the ring ports P1 and P2 (S140).

The switch 53 receives the frame 115-19 via one ring port of the ring ports P1 and P2 of the switch 53, thereby determining, as in FIG. 4, that the received frame f15-19 does not have a high importance (S220: NO). In such a case, the switch 53 transmits the already received frame f15-19 via the usual port P3 leading to the ECU 19, without waiting for another frame 115-19 via the other ring port of the ring ports P1 and P2 (S230).

(Advantageous Effects)

The switch 51-54 according to the present embodiment permits a highly important frame to be transmitted and received using two ring ports P1, P2, enabling the transmission using two communication routes. When the frames transmitted using two communication routes accord with each other to be an identical frame, the frame (i.e., the identical frame) is transmitted to the ECU serving as the transmission destination. This configuration thereby enhances the reliability of the communication. The above can improve the reliability of the communication from the ECU 15 to the ECU 19. In addition, the frame not having a high importance is transmitted and received via only one port of the ring ports P1 and P2, by using a single communication route alone. This can reduce traffic as compared with the configuration using a plurality of communication routes for transmission of each of the frames. The relaying apparatus of the present embodiment can balance between the reliability of the communication and the reduction of the traffic, in the communication network.

In addition, when making a negative determination of "NO" at S240 in FIG. 4, the switch 51-54 cancels the frame previously received via either the ring port P1 or the ring port P2. This prevents the switch 51-54 from continuing to wait for another highly important frame even though an occurrence of an anomaly such as in the communication route causes the switch 51-54 to fail to receive highly important frames via both the ring ports P1 and P2. In addition, the ECU serving as the transmission destination is prevented from receiving a frame which has not undergone any reliability check using the accordance determination at S250.

In addition, when canceling the frame received via any one of the ring ports P1 and P2, the switch 51-54 notifies at least any one of microcomputers in the communication network 1 of a message indicating that the received frame is canceled. This enables the microcomputer receiving such message to perform a fail-safe process in response to the cancellation of the frame.

In addition, the switch 51-54 determines the importance of the frame based on the importance information contained in the frame. This provides a simple determination of the importance of the frame. For example, the data item in the data area of the frame may be used for determining the importance; however, this is not simpler than the case using the importance information contained in the frame. In addition, the PCP of the VLAN tag area of the frame is used as the importance information. This eliminates the need of providing specially an area in the frame for locating importance information.

In FIG. 3, S120 by the communication controller 73 may be referred to as a first importance determination section, device, or module, or a first importance determiner; S130 and S140 by the communication controller 73 may be referred to as a number-of-ports switchover section, device, or module, or a number-of-ports switcher. In FIG. 4, S220 by the communication controller 73 may be referred to as a second importance determination section, device, or module, or a second importance determiner; S230 by the communication controller 73 may be referred to as a first transfer section, device, or module, or a first transferor; S250 by the communication controller 73 may be referred to as an accordance determination section, device, or module, or an accordance determiner; S260 and S270 by the communication controller 73 may be referred to as a second transfer section, device, or module, or a second transferor; S240 by the communication controller 73 may be referred to as a reception determination section, device, or module, or a reception determiner; S270 by the communication controller 73 may be referred to as a cancellation section, device, or module, or a canceller; and S280 by the communication controller 73 may be referred to as a notification section, device, or module, or a notifier.

Second Embodiment

Figure 5:
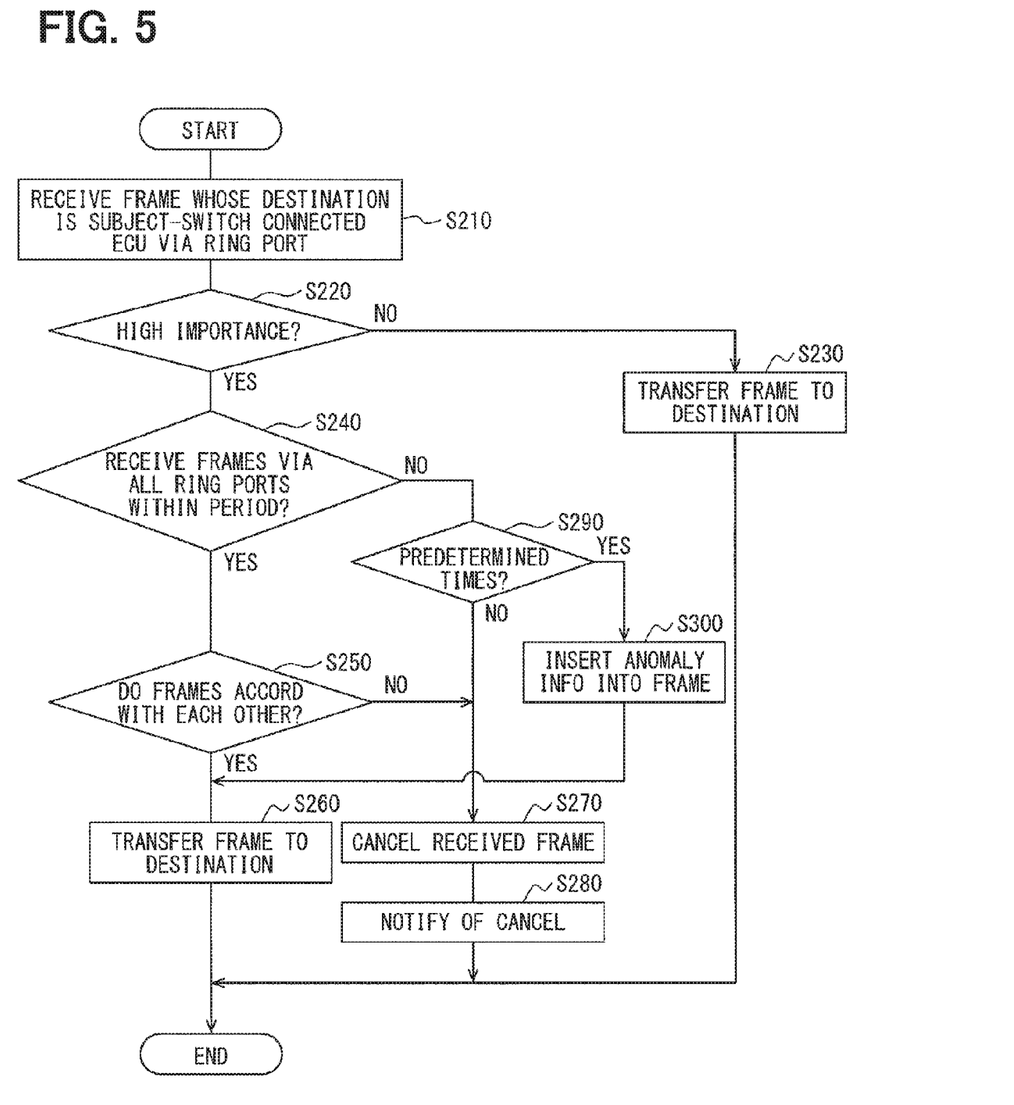
FIG. 5 is a flowchart illustrating a second transfer control process executed by a switch according to a second embodiment.

The following explains a second embodiment of the present disclosure with reference to FIG. 5 in addition to FIGS. 1-4 in the first embodiment since any constitutional element of the second embodiment identical to that of the first embodiment is assigned with an identical reference sign. This may be also applied to another embodiment to be described later.

The second embodiment provides a second transfer control process in FIG. 5, instead of the second transfer control process in FIG. 4 in the first embodiment. In detail, the second transfer control process in FIG. 5 additionally includes S290 and S300, as compared with FIG. 4.

As in FIG. 5, when a subject switch that is any one of the switches 51-54 makes a negative determination of "NO" at S240, the processing advances to S290. At S290, it is determined whether the determination at S240 is negated continuously predetermined times more than one time. When it is not determined that the determination at S240 is negated continuously predetermined times, the processing advances to S270. In contrast, when it is determined that the determination at S240 is negated continuously predetermined times, the processing advances to S300.

At S300, the subject switch assigns (i.e., inserts) anomaly information to the frame that is received via either the ring port P1 or the ring port P2; the anomaly information indicates the accordance determination at S250 is unexecuted (i.e., indicating the reliability check is unexecuted). This assigns the anomaly information to a determined target frame that is determined to have a high importance at S220. The processing advances to S260, where the frame to which the anomaly information is assigned is transferred to the transmission destination of the frame. That is, the subject switch transmits the frame assigned with the anomaly information via the usual port that leads to the ECU of the transmission destination.

Here, the anomaly information may be data containing at least one bit. In addition, the anomaly information may be assigned to a specific position in the VLAN tag area of the frame, or a specific position in another area of the frame, for example.

The switch 51-54 of the present embodiment can detect, at S290, that a failure arising in the communication route to the ring port P1, P2 causes the highly important frame to be received via only one port of the ring ports P1 and P2. When a failure arises in one route of the communication routes to one of the ring ports P1 and P2, the switch 51-54 transfers the frame, which is a highly important frame received via the other one port of the ring ports P1 and P2 through the normal communication route that is the other route, to the ECU of the transmission destination, without canceling the received frame. This prevents the highly important frame from failing to be transferred to the transmission destination.

Further, when a failure arises in one route of the communication routes to the respective ring ports P1 and P2, the highly important frame transferred to the transmission-destination ECU is assigned with the anomaly information. The assigned anomaly information enables the ECU receiving the transferred frame to recognize that the received frame has a low reliability. For example, the data contained in such received frame may be processed or treated in a manner different from a usual manner. For instance, the data in such received frame assigned with the anomaly information may be used only for a process requiring a lower reliability.

In FIGS. 5, S290 and S260 by the communication controller 73 may be referred to as a route-anomaly transfer section, device, or module, or a route-anomaly transferor; and S300 by the communication controller 73 may be referred to as an anomaly assignment section, device, or module, or an anomaly assignor, or further, an anomaly insertion section, device, or module, or an anomaly inserter.

Third Embodiment

The following explains a third embodiment of the present disclosure. The third embodiment provides a second transfer control process in FIG. 6, instead of the second transfer control process in FIG. 4 in the first embodiment. In detail, the second transfer control process in FIG. 6 additionally includes S310, as compared with FIG. 4.

Figure 6:
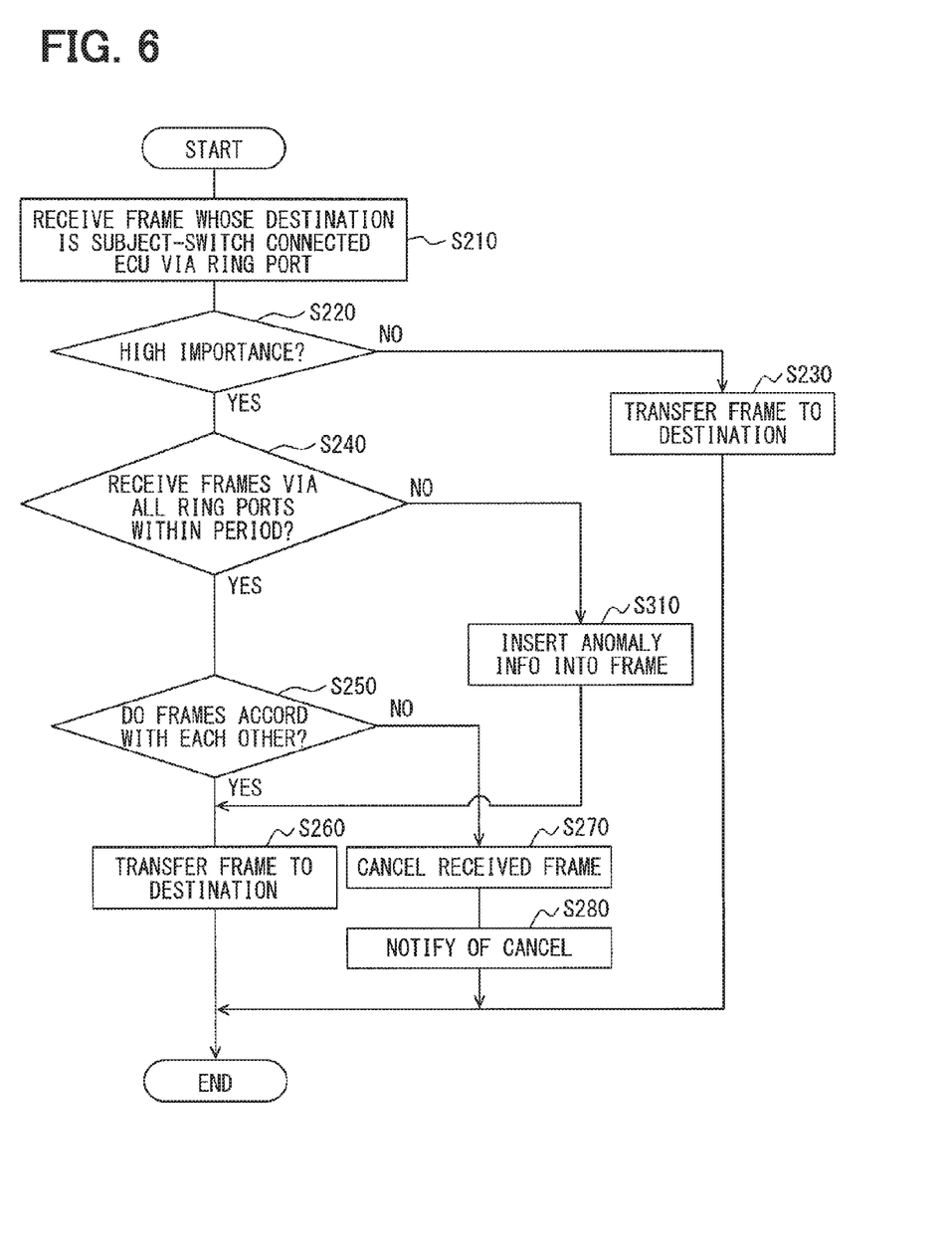
FIG. 6 is a flowchart illustrating a second transfer control process executed by a switch according to a third embodiment.

As in FIG. 6, when a subject switch that is any one of the switches 51-54 makes a negative determination of "NO" at S240, the processing advances to S310, which is identical to S300 in FIG. 5. That is, the subject switch assigns (i.e., inserts) the above-mentioned anomaly information to the frame that is received via either the ring port P1 or the ring port P2. The processing then advances to S260, where the frame to which the anomaly information is assigned is transferred to the transmission destination of the frame.

According to the switch 51-54 of the present embodiment, when a highly important frame is received via only one of the ring ports P1 and P2, such highly important frame received via the one of the ring ports P1 and P2 can be transferred to the transmission-destination ECU. Further, the highly important frame transferred to the transmission-destination ECU is assigned with the anomaly information. The assigned anomaly information enables the ECU receiving the transferred frame to recognize that the received frame has a low reliability. For example, the data contained in such received frame may be processed or treated in a manner different from a usual manner.

In FIGS. 6, S310 and S260 by the communication controller 73 may be referred to as a reception-anomaly transfer section, device, or module, or a reception-anomaly transferor.

Other Embodiments

Although the embodiment is described above, the present disclosure is not limited to the embodiment and can be modified in various manners. The number of ECUs, switches, or ports may be variable without need to be limited to the numbers indicated in the above embodiment, which are indicated as just examples.

The above embodiment employs a ring connection or ring topology as a network topology of the switches 51-54. Without need to be limited thereto, a network topology may use any one such as a mesh topology, a full contact topology, as long as a plurality of communication routes are provided between the switches. For example, when the topology of the four switches 51-54 employs a full contact topology, three ports of each switch 51-54 serve as redundant-route ports and three communication routes are provided between the switches 51-54. Even if another example is provided where the number of redundant-route ports is three or more, such example may be provided to include constituent elements similar to the above embodiments. In contrast, when the switches are connected to form a ring connection, the number of redundant-route ports may be only two, minimally. Such ring connection enables balance between (i) making communication routes redundant and (ii) reducing the number of redundant-route ports. Further, the usual ports P3 and P4 of each switch 51-54 may be connected to an ECU serving as a node via a different switch. In addition, a communications protocol may be other than Ethernet.

In addition, the present disclosure may be also directed to not only the above-mentioned switch serving as a relay apparatus, but also a communication network including the switches, a computer-implemented relay controlling method permitting a computer to function as the switch, a program product stored in a non-transitory computer-readable media including instructions achieving the method, and/or the media.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A relaying apparatus in a communication network including a plurality of relaying apparatuses that are defined to include the relaying apparatus and a plurality of different relaying apparatuses, each of the plurality of relaying apparatuses including at least two redundant-route ports providing a plurality of communication routes between the plurality of relaying apparatuses, a first one of the plurality of relaying apparatuses transmitting a frame via each of the redundant-route ports of the first one, the frame whose transmission destination is a connected apparatus that is connected with a second one of the plurality of relaying apparatuses via a usual port of the second one, the usual port being different from the redundant-route ports, the frame transmitted from the first one entering the plurality of relaying apparatuses other than the first one via the redundant-route ports of the plurality of relaying apparatuses other than the first one, the relaying apparatus comprising:
a first importance determination section that determines whether a first frame has a high importance based on a first rule, the first frame being received via the usual port of the relaying apparatus, the first frame having a transmission destination corresponding to a connected apparatus with which one of the plurality of different relaying apparatuses is connected via the usual port of the one of the plurality of different relaying apparatuses;
a number-of-ports switchover section that transmits the first frame via each of the redundant-route ports of the relaying apparatus when the first importance determination section determines that the first frame has the high importance, and transmits the first frame via one of the redundant-route ports of the relaying apparatus when the first importance determination section does not determine that the first frame has the high importance;
a second importance determination section that determines whether a second frame has a high importance based on a second rule identical to the first route of the first importance determination section, the second frame being received via one of the redundant-route ports of the relaying apparatus, the second frame having a transmission destination corresponding to a connected apparatus with which the relaying apparatus is connected via the usual port of the relaying apparatus;

a first transfer section that transfers the second frame when the second importance determination section does not determine that the second frame has the high importance, the second frame being transferred using the usual port via which the relaying apparatus is connected with the connected apparatus corresponding to the transmission destination of the second frame;

an accordance determination section that determines whether all frames received via the redundant-route ports of the relaying apparatus accord with each other when the second importance determination section determines that the second frame has the high importance, all the frames including the second frame received via the one of the redundant-route ports; and a second transfer section that transfers one of all the frames received via the redundant-route ports when the accordance determination section determines that all of the frames accord with each other, the one of all the frames being transferred using the usual port via which the relaying apparatus is connected with the connected apparatus corresponding to the transmission destination of the second frame, and cancels all the frames received via the redundant-route ports when the accordance determination section does not determine that all the frames accord with each other.

2. The relaying apparatus according to claim 1, wherein the first importance determination section determines whether the first frame has the high importance, based on an importance information item indicating an importance of the first frame among information items contained in the first frame; and the second importance determination section determines whether the second frame has the high importance, based on an importance information item indicating an importance of the second frame among information items contained in the second frame.

3. The relaying apparatus according to claim 1, further comprising:

a reception determination section that makes a reception determination within a predetermined time period when the second importance determination section determines that the second frame has the high importance, the predetermined time period starting from a time when the second frame is received via the one of the redundant-route ports, the reception determination being as to whether the relaying apparatus receives a different frame having a transmission destination identical to the transmission destination of the second frame via any different one of the redundant-route ports other than the one of the redundant-route ports; and a cancellation section that cancels the second frame via the one of the redundant-route ports when the reception determination section makes the reception determination negatively.

4. The relaying apparatus according to claim 3, further comprising:

a route-anomaly transfer section that deactivates the cancellation section when the reception determination section has made negatively the reception determination continuously predetermined times more than one time, and transfers the second frame received via the one of the redundant-route ports, using the usual port via which the relaying apparatus is connected with the connected apparatus corresponding to the transmission destination of the second frame.

5. The relaying apparatus according to claim 4, further comprising:

an anomaly insertion section that inserts anomaly information into the second frame that is transferred, the anomaly information indicating that the accordance determination section has made no determination with respect to the second frame.

6. The relaying apparatus according to claim 1, further comprising:

a reception determination section that makes a reception determination within a predetermined time period when the second importance determination section determines that the second frame has the high importance, the predetermined time period starting from a time when the second frame is received via the one of the redundant-route ports, the reception determination being as to whether the relaying apparatus receives a different frame having a transmission destination identical to the transmission destination of the second frame via any different one of the redundant-route ports other than the one of the redundant-route ports; and a reception-anomaly transfer section that inserts anomaly information into the second frame when the reception determination section makes negatively the reception determination, the anomaly information indicating that the accordance determination section has made no determination with respect to the second frame, and transfers the second frame, into which the anomaly information is inserted, using the usual port via which the relaying apparatus is connected with the connected apparatus corresponding to the transmission destination of the second frame.

7. The relaying apparatus according to claim 1, further comprising:

a notification section that notifies, when the second frame received via the one of the redundant-route ports is canceled, an arithmetic apparatus of a message indicating cancellation of the second frame.

8. The relaying apparatus according to claim 1, wherein a specified number of the redundant-route ports is two.

* * * * *